United States Patent
Lemsitzer et al.

(10) Patent No.: US 12,510,652 B2
(45) Date of Patent: Dec. 30, 2025

(54) COMMUNICATION NODE WITH INTERLEAVED RANGING SESSIONS

(71) Applicant: NXP B.V., Eindhoven (NL)

(72) Inventors: Stefan Lemsitzer, Stainz (AT); Michael Schober, Graz (AT)

(73) Assignee: NXP B.V., Eindhoven (NL)

( * ) Notice: Subject to any disclaimer, the term of this patent is extended or adjusted under 35 U.S.C. 154(b) by 397 days.

(21) Appl. No.: 18/083,682

(22) Filed: Dec. 19, 2022

(65) Prior Publication Data

US 2024/0201363 A1  Jun. 20, 2024

(51) Int. Cl.
*G01S 13/82* (2006.01)
*H04B 1/69* (2011.01)

(52) U.S. Cl.
CPC .............. *G01S 13/825* (2013.01); *H04B 1/69* (2013.01)

(58) Field of Classification Search
CPC ...................................................... G01S 13/825
See application file for complete search history.

(56) References Cited

U.S. PATENT DOCUMENTS

| | | | | |
|---|---|---|---|---|
| 2011/0292819 A1* | 12/2011 | Ekbal | ..................... | G01S 13/765 370/252 |
| 2017/0063477 A1* | 3/2017 | Reisinger | ................ | H04B 17/27 |
| 2017/0242092 A1 | 8/2017 | Marquez et al. | | |
| 2022/0345184 A1 | 10/2022 | Haslinger et al. | | |
| 2023/0171142 A1* | 6/2023 | Kassas | ................ | H04W 56/001 370/208 |

OTHER PUBLICATIONS

Figueroa, Adrian et al.; "Comparison of two-way ranging with FMCW and UWB radar systems"; 2016 13th Workshop on Positioning, Navigation and Communications (WPNC); Oct. 19-20, 2016, Bremen, Germany; DOI: 10.1109/WPNC.2016.7822856.
Staudinger Emanuel et al.; "Cramer-Rao lower bound for round-trip delay ranging with subcarrier-interleaved OFDMA"; IEEE Transactions on Aerospace and Electronic Systems; vol. 52, No. 6; Dec. 2016; DOI: 10.1109/TAES.2016.150893.
U.S. Appl. No. 17/817,419; Inventor, Boyoung Kim et al.; "Communication Device and Operating Method Thereof;", filed Aug. 4, 2022.

* cited by examiner

*Primary Examiner* — Robert W Hodge
*Assistant Examiner* — Helena H Seraydaryan

(57) ABSTRACT

Aspects of the present disclosure provide a dual phase-locked loop (PLL) system configured to execute parallel, time shifted ranging session scheduling even if the sessions use different communication channels. Using techniques described herein, in some embodiments, a delay between ranging sessions is reduced compared to other UWB session scheduling implementations, which allows for more compact scheduling and often more accurate measurements as a result.

20 Claims, 4 Drawing Sheets

COMMUNICATION NODE WITH INTERLEAVED RANGING SESSIONS

BACKGROUND

Ultra-wideband (UWB) is a technology that uses a high signal bandwidth for transmitting digital data over a wide spectrum of frequency bands with very low power. For example, in some cases UWB technology uses the frequency spectrum of 3.1 to 10.6 GHz and features a high-frequency bandwidth of more than 500 MHz and very short pulse signals, resulting in high data rates. UWB technology enables a high data throughput for communication devices and a high precision for the localization of devices. However, limitations in session scheduling can lead to inefficiency in ranging operations and inaccuracies in ranging results as a result.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

UWB technology may be used to measure the distance between a UWB communication node (for example, a mobile device that functions as a key for accessing a vehicle or opening a door) and various external UWB communication nodes (for example, a vehicle and a door). Typically, distance measurements are performed during UWB communication sessions referred to as ranging sessions. A typical UWB-based ranging session includes one or more messages (i.e., frames that are part of a distance estimation sequence) transmitted from a UWB communication node (which may also be referred to as a "reader") to one or more external UWB communication nodes (i.e., communication nodes which are external to the communication node), as well as one or more messages in response to those frames, which are transmitted back to the communication node by the external communication nodes. It is noted that, depending on the role assigned to the communication node and the external communication nodes in this message exchange, the communication node acts either as an "initiator" or "controller" (in which case the external communication nodes act as "responders" or "controlees") or the communication node acts as a "responder" or "controlee" (in which case the external communication nodes act as "initiators" or "controllers"). However, typical ranging sessions often suffer from reduced scheduler throughput and accuracy, as many existing ranging protocols limit the maximum number of sessions that can be scheduled within a given time by specifying durations for particular ranging message exchanges. Due to the limitations in typical ranging sessions often imposed by these ranging protocols, the available link budget can be limited and scheduling time consumption can be high.

Figure 2:
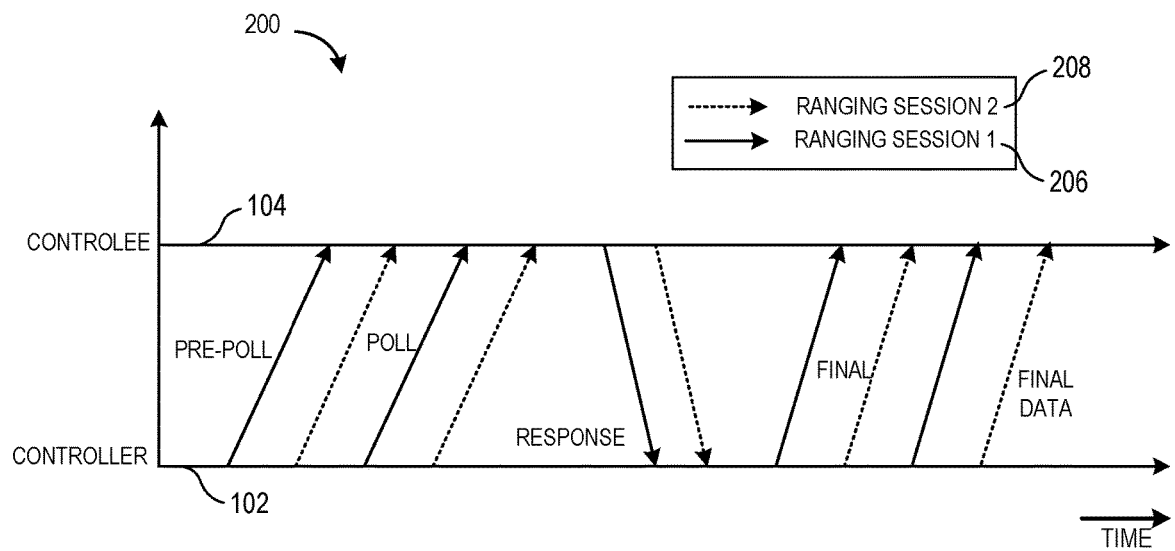
FIG. 2 is a timing diagram illustrating an example order of messages in interleaved ranging sessions implemented in accordance with some embodiments.
Figure 3:
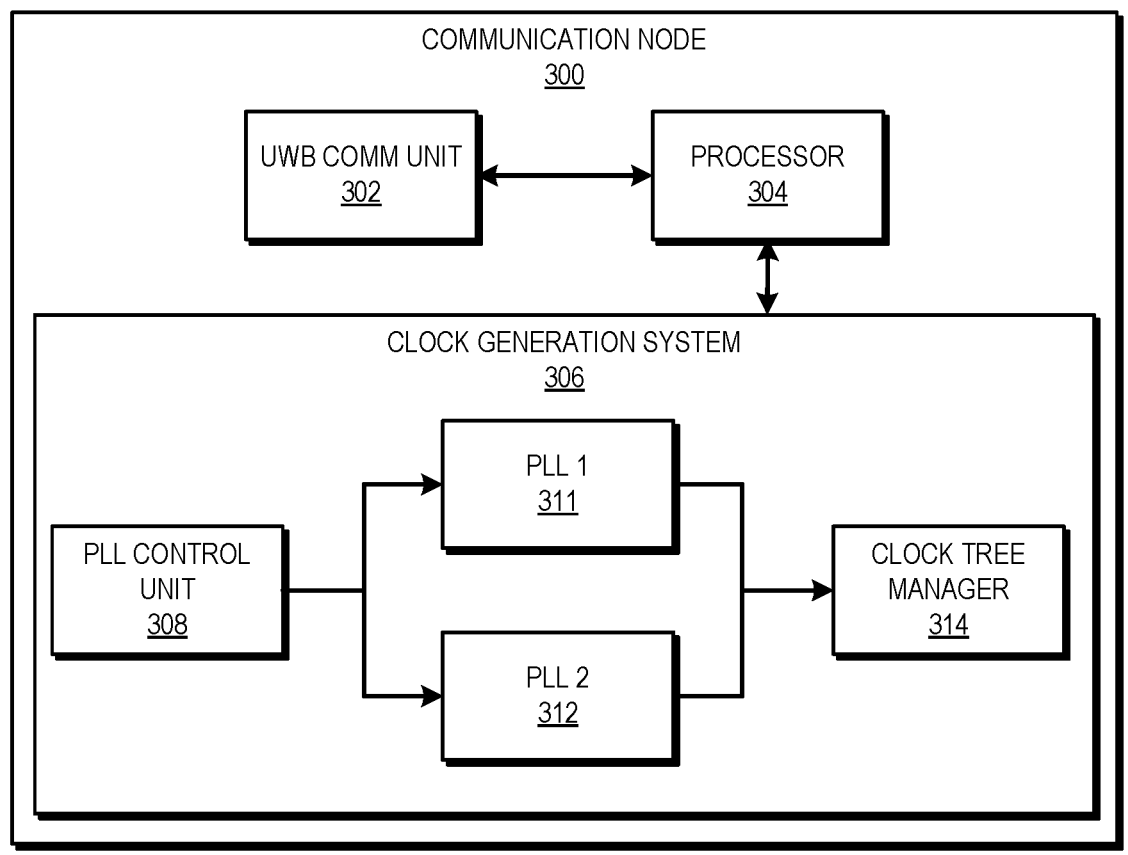
FIG. 3 is a block diagram of a communication node configured to perform interleaved ranging sessions in accordance with some embodiments.
Figure 4:
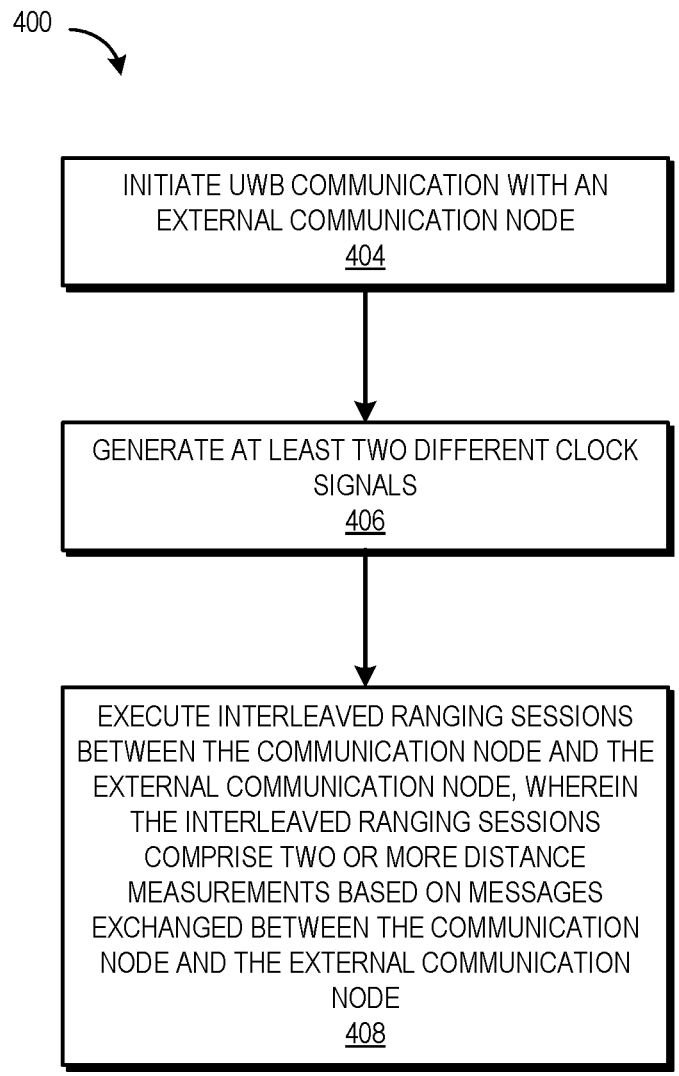
FIG. 4 is a block diagram of a method of interleaved ranging in accordance with some embodiments.

FIGS. 2-4 illustrate techniques for implementing a communication node with interleaved ranging sessions. In some embodiments, the communication node uses two different phase-locked loops (PLLs) to execute parallel, time-shifted session scheduling for interleaved ranging sessions even if the sessions are using different communication channels. In some embodiments, by using techniques described herein to implement interleaved ranging sessions, the delay between ranging sessions is reduced, which allows for more compact scheduling and often more accurate measurements as a result. Further, a PLL associated with the baseband frequency can remain unmodified while a different PLL can be adjusted, e.g., to provide a carrier signal for a different communication channel. By using two PLLs, different frequencies can be generated substantially simultaneously and utilized in an alternating fashion with very little delay associated with switching frequencies compared to reprogramming a PLL each time a new frequency is needed. Further, in some embodiments, by using two different PLLs to generate clocks for the communication node to use during ultra-wideband (UWB) communications, counters involved in making measurements based on a baseband frequency can be prevented from sensing any change in that frequency. As such, the counters are able to continue functioning without interruption or loss of accuracy even when interleaved ranging sessions use parallel protocol scheduling on different communication channels. In some embodiments, this significantly increases the scheduler throughput as a result of the expansion of the available link budget and reductions in scheduling time consumption.

Figure 1:
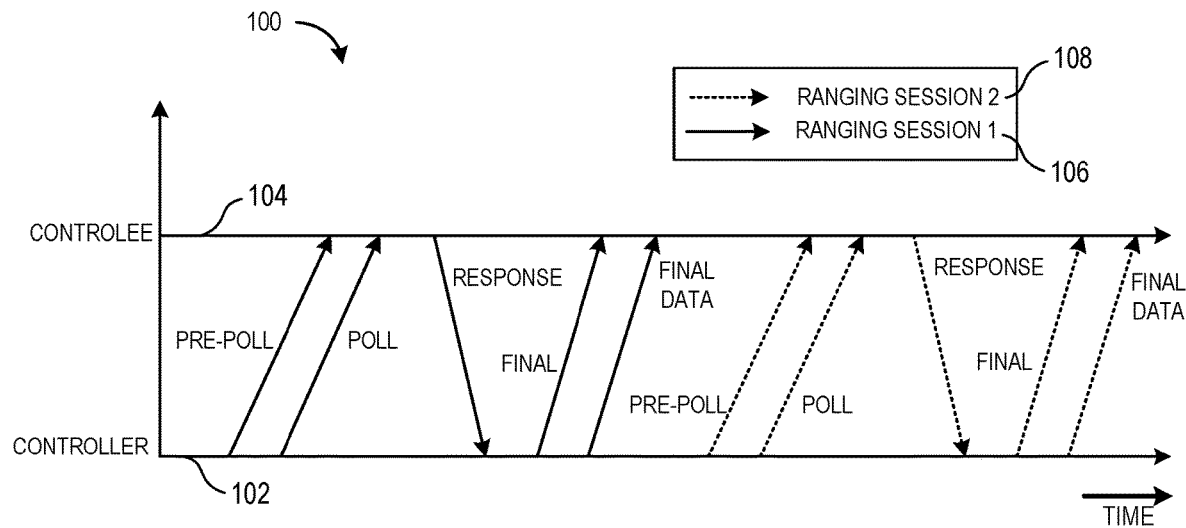
FIG. 1 is a timing diagram illustrating an order of messages in example ranging sessions.

FIG. 1 is a timing diagram 100 illustrating an order of messages (e.g., pre-poll, poll, response, final, and final data) in two example ranging sessions, i.e., ranging session 1 106 and ranging session 2 108, between a controller 102 and a controlee 104. As shown in the example UWB session scheduling implementation of FIG. 1, if a device has two active ranging sessions running, the device typically schedules the sessions sequentially. UWB technology uses a large signal bandwidth to produce accurate measurements. Because of this large signal bandwidth, many existing ranging protocols require hard real-time borders for communications or messages, such as packet exchanges. In view of these hard real-time borders, the maximum number of sessions that can be scheduled within a given time is typically fixed due to specified durations for ranging message exchanges. FIG. 1 shows an example of a commonly used scheduling approach where one session is scheduled after the other. However, scheduling ranging sessions sequentially can lead to inaccuracies in measurements. For example, if information derived from the two sessions needs to be compared or combined in some way, such as when multiple ranging sessions are used in high accuracy and/or high redundancy implementations or when different applications execute ranging sessions simultaneously, the time lag between execution of the two sessions can cause inaccurate measurements due to a non-negligible time gap of from about 7 milliseconds (ms) to about 28 ms between measurement data generation. The time lag can lead to a tracking or localization inaccuracy, for example, due to the time offset between the measurements. Additionally, when using the UWB session scheduling implementation of FIG. 1, a scheduler typically must identify two consecutive time slots for scheduling the sessions so as not to increase the session-to-session gap, as increasing the session-to-session gap could lead to an increased block size from a scheduling perspective in addition to any increased inaccuracies.

In order to overcome limitations in UWB session scheduling, in some embodiments, as shown in FIGS. 2-4, aspects of the present disclosure provide a dual PLL system configured to execute parallel, time-shifted session scheduling even if the sessions are using different communication channels. Using techniques described herein, in some embodiments, the above-mentioned delay between ranging sessions is reduced to a half communication slot length (e.g., about 4 ms) compared to the UWB session scheduling implementation of FIG. 1 (delay of about 7-28 ms), which allows for more compact scheduling and often more accurate measurements as a result.

FIG. 2 is a timing diagram 200 illustrating an example order of messages in interleaved ranging sessions implemented in accordance with some embodiments between a controller and controlee. As shown in FIG. 2, interleaving two ranging sessions such as ranging session 1 206 and ranging session 2 208 results in both ranging sessions executing concurrently and completing approximately simultaneously, and thus potentially improving measurement data generation accuracy as a result of receiving or determining the measurement data for both sessions approximately simultaneously.

Some UWB standards define a communication slot length between 1 ms and 8 ms, where packet transmission is always made at the beginning of a slot. In some implementations, about 80% or more of the slot duration is not actively used by the protocol itself. However, scheduling is improved in some embodiments by scheduling two ranging sessions to be time-interleaved from a packet perspective (i.e., without parallel packet transmission) but overlapping from protocol perspective (i.e., both protocols overlapping and time-shifted by a half slot length or a few hundred microseconds). As shown in FIG. 2, each individual message or packet of ranging session 1 206 and ranging session 2 208 is communicated in a serial or time-interleaved manner. However, ranging session 1 206 and ranging session 2 208 overlap from a protocol perspective, as packets related to both ranging sessions are transmitted during overlapping blocks of time, wherein at least one ranging session initiates or concludes while another ranging session is active. For example, in some embodiments, a UWB channel 9 message is followed by a channel 5 message, which necessitates a frequency change as the carrier frequency of channel 5 differs from the carrier frequency of channel 9. As UWB technology utilizes accurate baseband timestamps (e.g., measurements of time derived from a PLL) for estimating the time of flight (TOF) of a signal, in some embodiments, a baseband PLL (e.g., a PLL utilized to generate a baseband signal for communications) is utilized in addition to a radio frequency PLL. Without having two independent PLLs, in some embodiments, a change of the radio frequency PLL could compromise the time tracking of the baseband PLL, which should be avoided in order to ensure accurate measurements. However, in some embodiments, one or more PLL signals are received from an external source or a different source is used to generate one or more clock signals, such as a crystal oscillator. Notably, in some embodiments, a single PLL can be used to implement aspects of the present disclosure, for example when time tracking is not compromised.

FIG. 3 is a block diagram of a communication node 300 configured to perform interleaved ranging sessions in accordance with some embodiments. The communication node 300 comprises a UWB communication unit 302, a processor 304, and a clock generation system 306. The UWB communication unit 302 is configured to execute UWB communication with one or more of a plurality of external communication nodes. For instance, the UWB communication unit 302 may be configured to establish a UWB communication channel through which messages can be transmitted to and received from the external communication nodes. The processor 304 performs ranging sessions between the communication node and the one or more external communication nodes. The ranging sessions include one or more distance measurements based on messages exchanged between the communication node and the external communication nodes and the messages are exchanged through the UWB communication unit. For example, in some embodiments, the distance measurements are based on the cumulative TOF of messages transmitted by the communication node to one or more of the external communication nodes and responses transmitted by the external communication nodes to the communication node.

The clock generation system 306 executes interleaved ranging sessions between the communication node and the external communication node. The interleaved ranging sessions include two or more distance measurements based on messages exchanged between the communication node and the external communication node. It is noted that although the processor 304 and the clock generation system 306 are shown as separate units, they may also be implemented as a single component or a single unit of the communication node. Thus, the system architecture may be implementation-dependent, and the functions of the processor 304 and the clock generation system 306 may for example be performed by a microcontroller, which in some embodiments acts as a host device for the UWB communication unit 302.

As shown in FIG. 3, in some embodiments, the clock generation system 306 includes a PLL control unit 308, two phase-locked loops (a first PLL 311 and a second PLL 312), and a clock tree manager 314. In some embodiments, aspects of the clock generation system 306 of FIG. 3 enable interleaved packet scheduling without compromising baseband time understanding (e.g., without sacrificing accurate timestamps). In order to execute interleaved ranging sessions between the communication node and the external communication node, in some embodiments, the PLL control unit 308 receives information (e.g., from the processor 304) providing a configuration for the first PLL 311 (e.g., a baseband PLL) and the second PLL 312 (e.g., a radio frequency PLL). In case of a channel 9 packet exchange, for example, in some embodiments, the second PLL 312 is set to a corresponding carrier frequency. If a channel swich is needed, the carrier frequency of the second PLL 312 (e.g., the radio frequency PLL) is changed while the frequency of the first PLL (e.g., the baseband PLL) is not modified. In this way, baseband-based counters responsible for estimating TOF will not sense any change in the frequency of the second PLL 312 (e.g., the radio frequency PLL) and so are able to continue functioning without interruption or loss of accuracy.

Independently from the configured PLL frequencies of the first PLL 311 and the second PLL 312, in some embodiments, the clock tree manager 314 distributes the clock signals to other hardware that require a radio frequency or baseband PLL input. This allows for independent switching and gating of the PLLs 311, 312, which allows for power optimizations, as the PLLs 311, 312 can be used by the clock tree manager 314 to generate two or more clock signals as needed for, e.g., the processor 304, the UWB communication unit 302, or another component of the communication node 300. However, it is noted that this is just one example about how a dual frequency signal can be generated without compromising the time basis. As noted above, in some embodiments, a single PLL system can be used to implement aspects of the present disclosure. For example, in some embodiments, a single PLL system can be used when a frequency switch of the single PLL is possible while maintaining accurate timing without drift.

FIG. 4 is a block diagram of a method 400 of interleaved ranging in accordance with some embodiments, which in some embodiments is performed by the processor 304 of the communication node 300 of FIG. 3. At block 404, a UWB communication unit, such as the UWB communication unit 302 of FIG. 3, initiates UWB communication with an external communication node. In some embodiments, initiation of UWB communication includes enabling or otherwise causing UWB communications to be established with at least one external communication unit. At block 406, a clock generation system, such as the clock generation system 306 of FIG. 3, generates at least two different clock signals. In some embodiments, the clock generation system 306 generates the two different clock signals based on two or more PLLs, such as PLLs 311, 312 of FIG. 3.

At block 408, a processor executes interleaved ranging sessions between the communication node and the external communication node based on the two different clock signals, wherein the interleaved ranging sessions comprise two or more distance measurements based on messages exchanged between the communication node and the external communication node and wherein the messages are exchanged through the UWB communication unit. As indicated in FIG. 2, in some embodiments, the clock generation system 306 generates one of the two different clock signals by modifying one of the two phase-locked loops in order to change the PLL frequency. In some embodiments, as also indicated in FIG. 2, the interleaved ranging sessions include a first ranging session and a second ranging session. As discussed above, in some embodiments, the processor 304 executes the two ranging sessions concurrently so as to overlap execution of the ranging sessions, resulting in the ranging sessions completing substantially simultaneously and therefore minimizing lag between measurement data from the two sessions. For example, in some embodiments, as shown in FIG. 2, the first ranging session comprises at least two messages and the second ranging session comprises at least one message transmitted between the two messages of the first ranging session. Even if the ranging sessions are not performed simultaneously, efficiency of the overall ranging sessions is improved by interleaving messages for the ranging sessions such that at least one message from a ranging session is transmitted between two messages of another ranging session.

Figure 5:
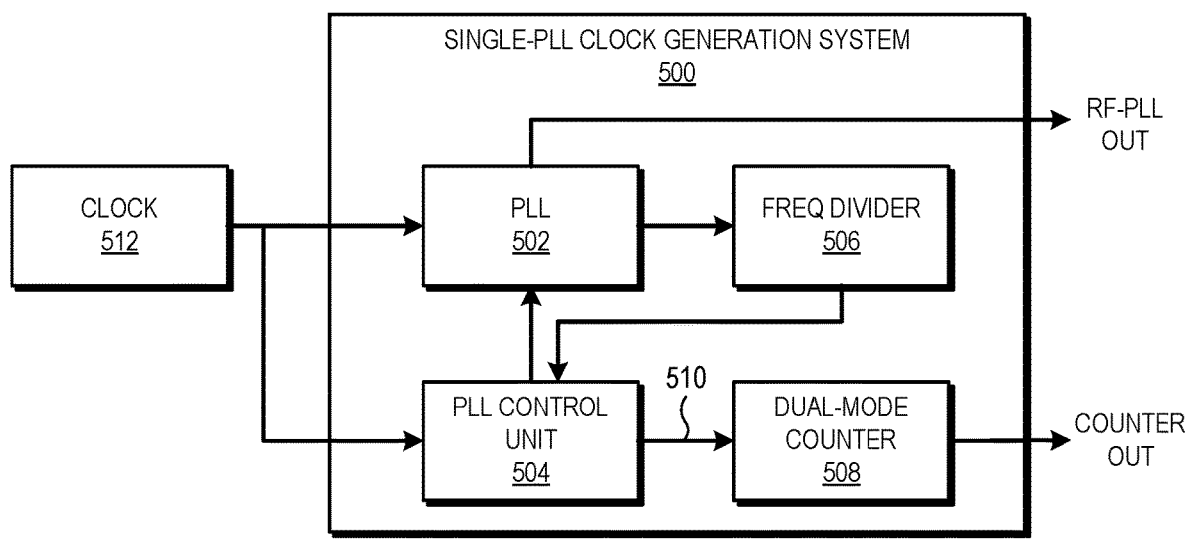
FIG. 5 is a block diagram of a communication node configured to perform interleaved ranging sessions with a single phase-locked loop in accordance with some embodiments.

FIG. 5 is a block diagram of a single-PLL clock generation system 500 in accordance with some embodiments. As shown, in some embodiments, the single-PLL clock generation system 500 includes a PLL 502, a PLL control unit 504, a frequency divider 506, and a dual-mode counter 508. In some implementations, the PLL control unit 504 provides one or more signals 510, such as a low-frequency clock, a high-frequency clock, and/or one or more control signals, to the dual-mode counter 508. In some implementations, in order to maintain accurate timing using a single PLL without drift, when the PLL 502 switches clock frequencies, the dual-mode counter 508 runs on a low frequency clock provided by the PLL control unit 504. Accordingly, the dual-mode counter 508 is incremented by a multiple of a high frequency clock provided by the PLL control unit 504. In some implementations, the amount by which the dual-mode counter 508 is incremented depends on a ratio or difference between an external clock 512, which is a low frequency clock (e.g., 38.4 MHZ) in some embodiments, and the high frequency clock provided by the PLL control unit 504.

During the transition from one frequency to another, in some implementations, a "counter out" value produced by the dual-mode counter 508 is incremented, e.g., by 26 in the case of a 998.4 MHz high resolution clock based on a 38.4 MHz external clock, for every low frequency clock cycle in the low frequency clock provided by the PLL control unit 504. At the start of the PLL frequency transition, the dual-mode counter 508 switches modes prior to the PLL changing frequency to avoid any frequency-change based inaccuracy. In some implementations, the frequency switch occurs at a synchronized moment in time, such as the occurrence of the rising edge of the low frequency clock provided by the PLL control unit 504. Once the PLL 502 is locked to the new frequency, the frequency divider 506 can be changed accordingly. The mode of the dual-mode counter 508 can then be swapped back to a high frequency clock mode. In some implementations, this transmission also occurs at a synchronized moment in time.

In some embodiments, certain aspects of the techniques described above may be implemented by one or more processors of a processing system executing software. The software comprises one or more sets of executable instructions stored or otherwise tangibly embodied on a non-transitory computer readable medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A communication node, comprising:
   an ultra-wideband (UWB) communication unit configured to initiate UWB communication with an external communication node;
   a clock generation system configured to generate at least two different clock signals; and
   a processor configured to execute interleaved ranging sessions between the communication node and the external communication node based on the at least two different clock signals, wherein the interleaved ranging sessions comprise two or more distance measurements based on messages exchanged between the communication node and the external communication node, wherein the interleaved ranging sessions comprise a first ranging session and a second ranging session, wherein the processor is configured to overlap execution of the first ranging session and the second ranging session, and wherein the messages are exchanged through the UWB communication unit.

2. The communication node of claim 1, wherein the clock generation system comprises at least one phase-locked loop.

3. The communication node of claim 1, wherein the first ranging session comprises two messages and the second ranging session comprises at least one message transmitted between the two messages of the first ranging session.

4. The communication node of claim 1, wherein the processor is configured to concurrently execute the first ranging session and the second ranging session.

5. A communication node, comprising:
   an ultra-wideband (UWB) communication unit configured to initiate UWB communication with an external communication node;
   a clock generation system configured to generate at least two different clock signals, wherein the clock generation system comprises at least one phase-locked loop, wherein the clock generation system is configured to generate the two different clock signals based on at least one of:
   two phase-locked loops; and
   a single phase-locked loop capable of switching frequencies while maintaining accurate timing without drift; and
   a processor configured to execute interleaved ranging sessions between the communication node and the external communication node based on the at least two different clock signals, wherein the interleaved ranging sessions comprise two or more distance measurements based on messages exchanged between the communication node and the external communication node, wherein the messages are exchanged through the UWB communication unit.

6. The communication node of claim 5, wherein the clock generation system is configured to generate one of the at least two different clock signals by modifying at least one of:
   one of the two phase-locked loops; and
   a frequency of the single phase-locked loop.

7. The communication node of claim 5, wherein the interleaved ranging sessions comprise a first ranging session and a second ranging session.

8. The communication node of claim 7, wherein the first ranging session comprises two messages and the second ranging session comprises at least one message transmitted between the two messages of the first ranging session.

9. The communication node of claim 7, wherein the processor is configured to concurrently execute the first ranging session and the second ranging session.

10. The communication node of claim 7, wherein the processor is configured to overlap execution of the first ranging session and the second ranging session.

11. A non-transitory computer readable medium embodying a set of executable instructions, the set of executable instructions to manipulate at least one processor to:
    initiate ultra-wideband (UWB) communication with an external communication node;
    generate at least two different clock signals; and
    execute interleaved ranging sessions between the communication node and the external communication node, wherein the interleaved ranging sessions comprise two or more distance measurements based on messages exchanged between the communication node and the external communication node, wherein the instructions to execute interleaved ranging sessions include instructions to overlap the first ranging session and the second ranging session.

12. The non-transitory computer readable medium of claim 11, wherein the instructions include instructions to generate one of the at least two different clock signals by modifying one of two phase-locked loops.

13. The non-transitory computer readable medium of claim 11, wherein the interleaved ranging sessions comprise a first ranging session and a second ranging session.

14. The non-transitory computer readable medium of claim 13, wherein the first ranging session comprises two messages and the second ranging session comprises at least one message transmitted between the two messages of the first ranging session.

15. The non-transitory computer readable medium of claim 13, wherein the instructions include instructions to concurrently execute the first ranging session and the second ranging session.

16. A method of operating a communication node, comprising:
- initiating ultra-wideband (UWB) communication with an external communication node;
- generating at least two different clock signals; and
- executing interleaved ranging sessions between the communication node and the external communication node, wherein executing interleaved ranging sessions comprises overlapping execution of a first ranging session and a second ranging session, and wherein the interleaved ranging sessions comprise two or more distance measurements based on messages exchanged between the communication node and the external communication node.

17. The method of claim 16, further comprising generating one of the at least two different clock signals by at least one of:
- modifying one of two phase-locked loops; and
- modifying the frequency of a single phase-locked loop capable of switching frequencies while maintaining accurate timing without drift.

18. The method of claim 16, wherein the interleaved ranging sessions comprise the first ranging session and the second ranging session.

19. The method of claim 18, wherein the first ranging session comprises two messages and the second ranging session comprises at least one message transmitted between the two messages of the first ranging session.

20. The method of claim 18, wherein executing interleaved ranging sessions comprises concurrently executing the first ranging session and the second ranging session.

* * * * *